(12) United States Patent
Bicik et al.

(10) Patent No.: US 12,073,059 B2
(45) Date of Patent: Aug. 27, 2024

(54) GENERATING A SERIES OF CONTENT AREAS FOR PRESENTATION AT A DISPLAY SCREEN RELATED TO AN OVERALL MACHINE-RELATED-STATUS OF A MACHINE-SYSTEM

(71) Applicant: ABB Schweiz AG, Baden (CH)

(72) Inventors: Josef Bicik, Prague (CZ); Mark Stefan Struempfler, Mannheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/992,345

(22) Filed: Nov. 22, 2022

(65) Prior Publication Data

US 2023/0168791 A1    Jun. 1, 2023

(30) Foreign Application Priority Data

Nov. 26, 2021 (EP) .................................. 21210839

(51) Int. Cl.
*G06F 3/0482* (2013.01)
*G06F 3/04886* (2022.01)
*G06F 9/451* (2018.01)

(52) U.S. Cl.
CPC ........ *G06F 3/0482* (2013.01); *G06F 3/04886* (2013.01); *G06F 9/451* (2018.02)

(58) Field of Classification Search
CPC .............. G05B 19/042; G05B 23/0272; G05B 23/0221; G05B 23/027; G05B 19/05;

(Continued)

(56) References Cited

U.S. PATENT DOCUMENTS 5,060,170 A    10/1991    Bourgeois et al.
5,412,400 A    5/1995    Takahara et al.

(Continued)

FOREIGN PATENT DOCUMENTS

| DE | 112014001425 T5 | 12/2015 |
| EP | 3211524 A1 | 8/2017 |
| EP | 3697059 A1 | 8/2020 |

OTHER PUBLICATIONS

European Patent Office, Extended European Search Report in European Patent Application No. 21210839.3, 15 pp. (Aug. 16, 2022).

*Primary Examiner* — Richard J Hong
(74) *Attorney, Agent, or Firm* — Leydig, Voit & Mayer, Ltd.

(57) ABSTRACT

A system and method for generating a series of content areas for presentation at a display screen that are related to an overall machine-related-status of a machine-system, including: providing a status at an input of a first processing unit; accessing a first database-system storing a plurality of series of content areas including a respective position of each of the content areas for presentation at a display screen assigned to the respective overall machine-related-status; determining the series of content areas related to the actual overall machine-related-status for selecting the series of content areas assigned to the actual overall machine-related-status, and generating the selected series of content areas, including a respective position of each of the content areas for presentation the series of content areas related to the actual provided machine-system status at the respective position at the display screen.

12 Claims, 3 Drawing Sheets

(58) Field of Classification Search
CPC .... G06F 3/0482; G06F 3/04886; G06F 9/451; G06F 16/2452; G06F 16/254; G06F 8/38; G06F 3/1446; G06F 8/34; H04L 67/10; H04L 67/12; G06Q 50/04; G08G 1/20
See application file for complete search history.

(56) References Cited

U.S. PATENT DOCUMENTS

| | | |
|---|---|---|
| 8,434,019 B2 | 4/2013 | Nelson |
| 8,648,814 B2 | 2/2014 | Duchene et al. |
| 2002/0147511 A1* | 10/2002 | Eryurek ............... G05B 23/027 700/80 |
| 2007/0094612 A1 | 4/2007 | Kraft et al. |
| 2007/0211079 A1* | 9/2007 | Nixon ..................... G06F 8/38 345/619 |
| 2009/0217200 A1* | 8/2009 | Hammack ............... G06F 8/34 715/810 |
| 2010/0156654 A1* | 6/2010 | Bullemer ........... G05B 23/0272 340/691.6 |
| 2011/0252355 A1* | 10/2011 | Nixon .................... H04L 67/12 715/771 |
| 2011/0283226 A1 | 11/2011 | Basson et al. |
| 2012/0198390 A1* | 8/2012 | Bogusky ................ G06Q 50/04 715/854 |
| 2013/0002697 A1* | 1/2013 | Ashley ............... G05B 23/0272 345/589 |
| 2015/0088708 A1* | 3/2015 | Fain ........................ G08G 1/20 705/337 |
| 2015/0193418 A1* | 7/2015 | Koska .................... H04L 67/10 715/223 |
| 2015/0220076 A1* | 8/2015 | Uchida ................. G05B 19/05 700/97 |
| 2016/0098388 A1* | 4/2016 | Blevins ................ G06F 16/254 707/755 |
| 2017/0103103 A1* | 4/2017 | Nixon ................ G06F 16/2452 |
| 2018/0322770 A1* | 11/2018 | Srinivasan ......... G05B 23/0272 |
| 2018/0373229 A1* | 12/2018 | Naidoo ............. G05B 23/0221 |
| 2019/0102076 A1* | 4/2019 | Naidoo ................ G06F 3/1446 |
| 2019/0294158 A1* | 9/2019 | Hokeness ............ G05B 23/027 |

\* cited by examiner

GENERATING A SERIES OF CONTENT AREAS FOR PRESENTATION AT A DISPLAY SCREEN RELATED TO AN OVERALL MACHINE-RELATED-STATUS OF A MACHINE-SYSTEM

CROSS-REFERENCE TO RELATED APPLICATIONS

This patent application claims priority to European Patent Application No. 21210839.3, filed on Nov. 26, 2021, which is incorporated herein in its entirety by reference.

FIELD OF THE DISCLOSURE

The present disclosure relates to operator displays for plant operation.

BACKGROUND OF THE INVENTION

In plant operation, certain procedure instances related to plants like start-up or shutdown of equipment, emptying tanks, etc. are executed in an operator room manually. According to state of the art, special operator displays or event batch recipe systems are provided to operators to enforce a fast and reliable execution of manual procedure instances and to increase the productivity.

BRIEF SUMMARY OF THE INVENTION

Manually opening and moving faceplates and/or views and/or popups to a desired position by an operator is slow and/or can waste time of an operator working at an industrial workplace, particular when fast reaction is required in critical situations.

Accordingly, the present invention is related to a method for generating a series of content areas for presentation at a display screen, a method to assign a series of content areas, a first processing unit, a use of the first processing unit for generating a series of content areas, a computer program and a computer readable medium as described in the independent claims.

In the present disclosure, the sequence of procedural steps is presented in such a way that the process is easily comprehensible. However, the skilled person will recognize that many of the process steps can also be executed in a different order and lead to the same or a corresponding result. In this sense, the sequence of the process steps can be changed accordingly. Some features are provided with counting words to improve readability or to make the assignment more clear, but this does not imply the presence of certain features.

The term "configured to" and equivalent can mean that something is implemented and/or realised and/or modified and/or built and/or adapted to provide a specific functionality.

To achieve these and other advantages and in accordance with the purpose of the invention, as embodied and broadly described herein, there is provided a method for generating a series of content areas for presentation at a display screen, wherein the series of content areas is related to an overall machine-related-status of a machine-system, including the steps:

providing an actual overall machine-related-status at an input of a first processing unit;
accessing a first database-system by means of the first processing unit, the first database-system storing a plurality of series of content areas including a respective position of each of the content areas for presentation at a display screen assigned to the respective overall machine-related-status;
determining the series of content areas related to the actual overall machine-related-status, by comparing the actual provided overall machine-related-status with the stored plurality of overall machine-related-status, which are assigned to the respective series of content areas, for selecting the series of content areas assigned to the actual overall machine-related-status, by means of the first processing unit; and
generating the selected series of content areas, including a respective position of each of the content areas, by means of the first processing unit, for presentation the series of content areas related to the actual provided machine-system status at the respective position at the display screen.

BRIEF DESCRIPTION OF THE SEVERAL VIEWS OF THE DRAWING(S)

DETAILED DESCRIPTION OF THE INVENTION

Figure 1:
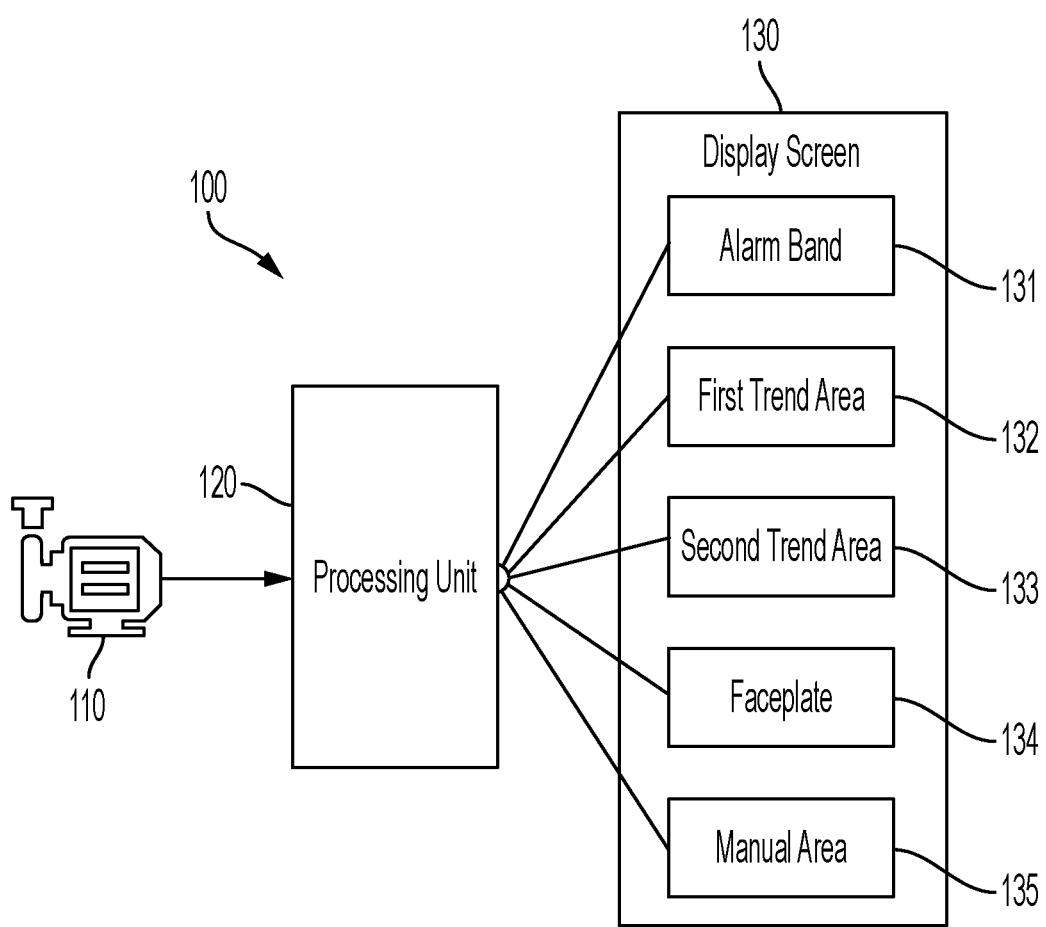
FIG. 1 is a block diagram of a machine-system coupled to a processing unit including an operator workspace in accordance with the disclosure.

FIG. 1 sketches schematically a machine-system 110 signally coupled to a processing unit 120, which can be included in a user workspace and coupled to a display screen 130 with different kinds of content areas: including an alarm band 131, a first trend area 132, a second trend area 133, a faceplate 134 and a manual area 135.

Figure 2:
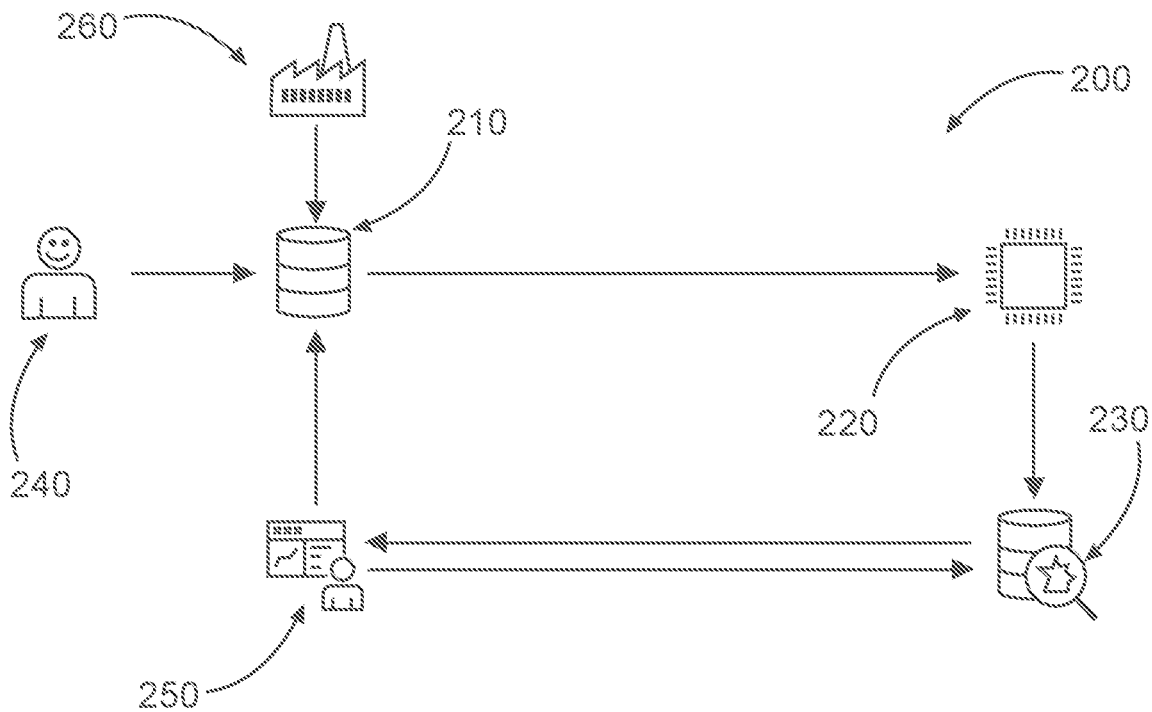
FIG. 2 is a flow diagram of data exchanged within a distributed process control system in accordance with the disclosure.

FIG. 2 sketches schematically a flow diagram of data exchanged within a distributed process control system 200. A second database-system 210 is configured to store data of a plurality of machine-systems 260 and related machine-operation related information, which can include related data of a user 240, and related data provided by a HMI workplace 250. The stored data of the second database-system 210 can be analyzed, using a second processing unit 220 to generate a plurality of series of content areas, which are assigned to an overall machine-related-status, and stored in a first database-system 230. A user at the HMI workspace 250 can initiate a generation of a series of content areas, which are assigned to the actual overall machine-related-status of the machine-system 260. The user 240, who can operate at the HMI workspace 250, can change a specific assignment of an overall machine-related-status with a series of content areas stored in the first database-system 230.

Figure 3:
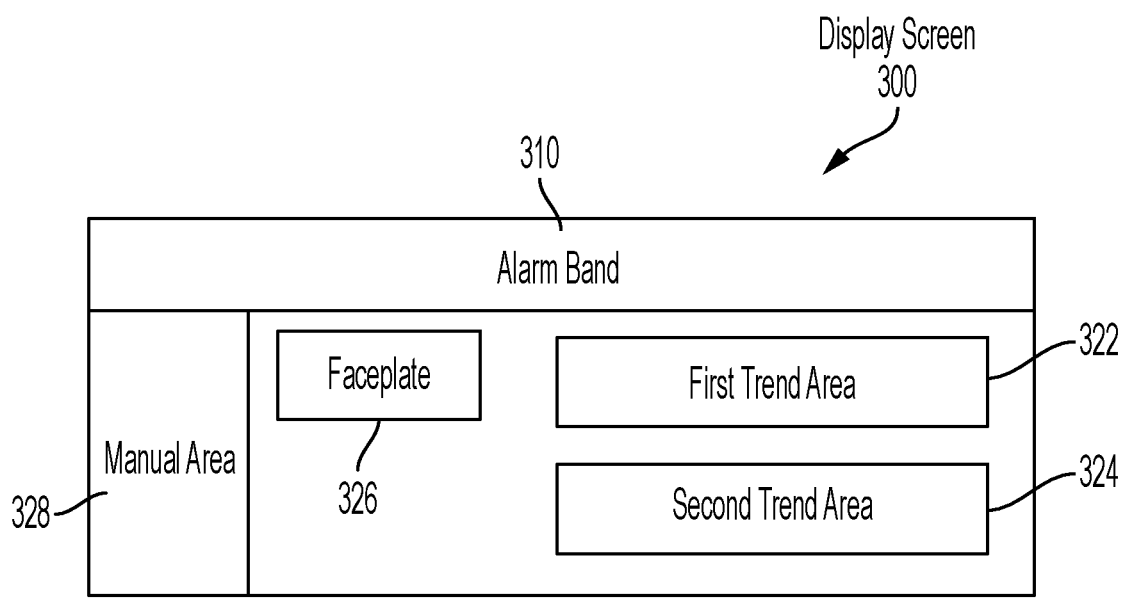
FIG. 3 is an exemplary layout of a display screen in accordance with the disclosure.

FIG. 3 sketches schematically a layout of a display screen 300 with presented content areas 310, 322, 324, 326 and 328, including an alarm band 310, a first trend area 322, a second trend area 324, a faceplate 326 and a manual area 328.

Figure 4:
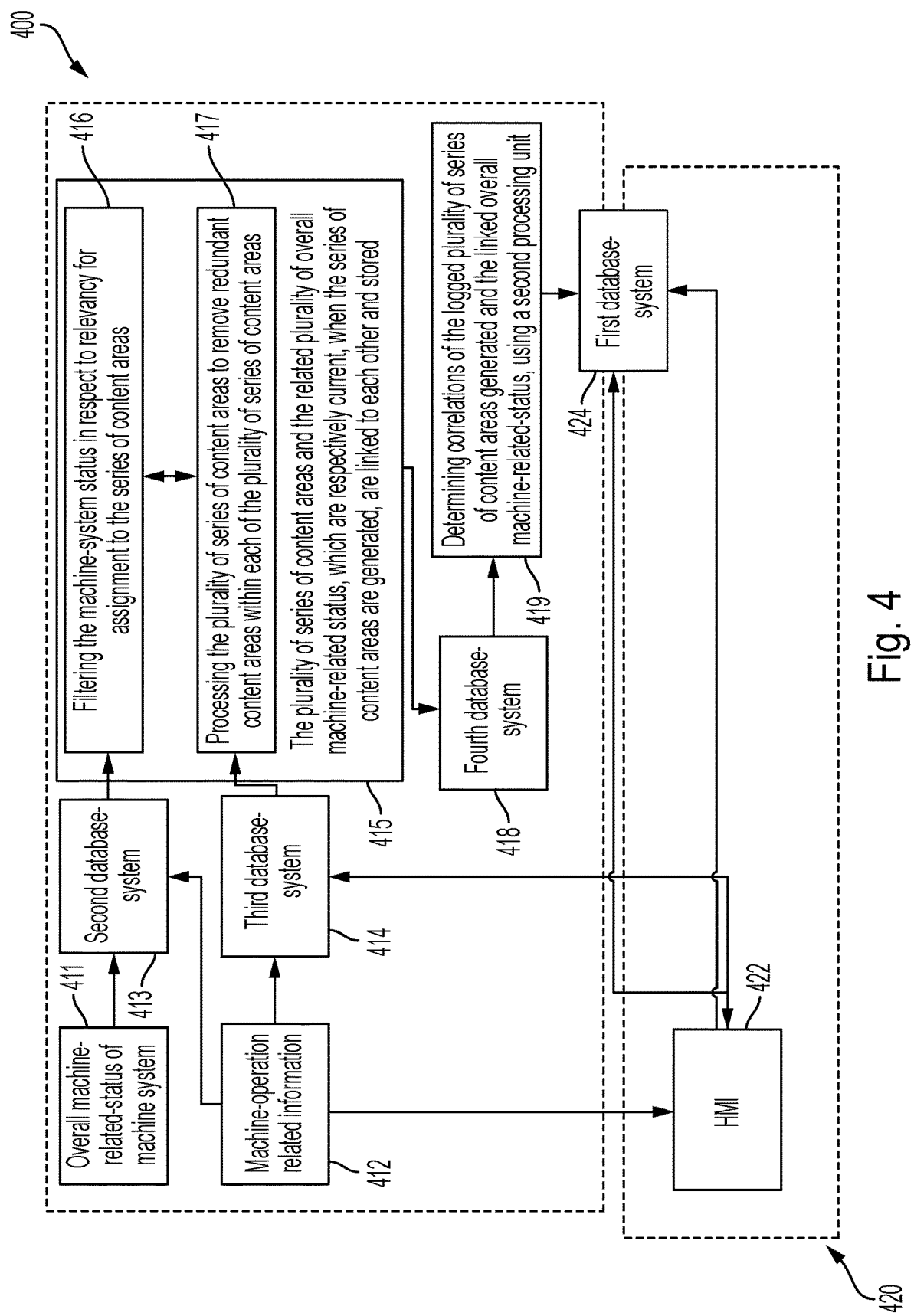
FIG. 4 is a flowchart for a method method of assigning a series of content areas in accordance with the disclosure.

The upper part of FIG. 4 sketches schematically a flow diagram 400 of a method to assign a series of content areas, which are generated for presentation at a display screen of a human machine interface (HMI) of a workplace 422, to an overall machine-related-status of a machine-system 411.

A plurality of series of content areas generated for presentation at the display screen of the HMI 422, including a respective position for presentation at the display screen of the HMI 422 of each of the content areas can be logged using a third database-system 414.

Optionally, the plurality of series of content areas can be formed, by grouping consecutive generated content areas for the display screen, based on a common specific first content area, that means a trigger action, as e.g. "a user opened a view with a process graphic A" and related follow-up actions, e.g., "a user moved the view to screen 1" and "a user opened a trend view."

Optionally, the plurality of series of content areas can be processed in step 417 to remove redundant content areas within each of the plurality of series of content areas, as e.g. obviously erroneous actions to generate a content area, as e.g. a content area which is opened and shortly afterwards closed.

A plurality of machine-system status of the overall machine-related-status of the machine system 411 can be logged using a second database-system 413.

Machine-operation related information 412, including device information and/or operational user information and/or individual user information, as provided by the HMI 422, is logged and stored respectively with a related machine-system status in the second database-system 413, which is coupled to the machine-system 411, resulting in a plurality of overall machine-related-status, which are stored in the second database-system 413.

Optionally, at step 416 the machine-system status can be filtered in respect to relevance for assignment to the series of content areas.

A relevance of a subset of machine-system status can be determined based on the time of the actions taken place, as e.g. alarms and/or process values, and relationships amongst machine-systems and/or machine-subsystems involved. The machine-system status can include status values logged prior to a point in time where the user generates a first content area for presentation at the display screen.

At step 415, the plurality of series of content areas and the, particularly timely, related plurality of overall machine-related status, which are respectively current, when the series of content areas are generated, are linked to each other and stored in a fourth database-system 418.

At step 419, correlations of the logged plurality of series of content areas generated and the linked overall machine-related-status are determined, particularly using a second processing unit.

Overall machine-system-status with linked respective series of content areas are determined, including the respective position of each of the content areas generated, which are correlating, are assigned to each other. These correlating series of content areas generated, including the respective position, and respectively assigned overall machine-related-status are stored using a first database-system 424.

The correlation of the logged plurality of series of content areas generated for presentation at the display screen and the linked overall machine-related-status can be determined based on a statistical analysis and/or a pattern recognition method and/or a principal component analysis method to filter most significant correlations and/or comprises utilization of an unsupervised learning algorithm to train a neural network to identify appropriate correlating relationships.

The correlation can be measured by a probability metric, which is determined for each trigger action, which is linked to a comparable overall machine-related-status.

The lower part of FIG. 4 sketches schematically a flow diagram 420 of a method for generating a series of content areas for presentation at a display screen.

When a user of the HMI workplace 422 initiates a generation of a series of content areas for presentation at a display screen, an actual overall machine-related-status is provided at, an input of a first processing unit is provided by the machine-system and particularly by the HMI workplace, which is configured to provide machine-operation related information. The first processing unit, which can be a part of the HMI workplace 422, is accessing the first database-system 424, wherein the first database-system 424 is storing a plurality of series of content areas, including a respective position of each of the content areas, for presentation at a display screen of the HMI workplace 422 assigned to the respective overall machine-related-status. The first processing unit is configured to determine the series of content areas related to the actual overall machine-related-status of the machine-system 411, by comparing the actual provided overall machine-related-status with the stored plurality of overall machine-related-status, which are assigned to the respective series of content areas, for selecting the series of content areas assigned to the actual overall machine-related-status. Further, the first processing unit can be configured to generate the selected series of content areas, including a respective position of each of the content areas, for presentation the series of content areas related to the actual provided machine-system status at the respective position at the display screen, preferably of the HMI workplace 422.

Optionally, the actual provided overall machine-related-status can be compared with the stored plurality of overall machine-related-status based on a calculation, whether a similarity value of the actual provided overall machine-related-status and one of the stored plurality of overall machine-related-status is within boundary values for comparing.

Using other words, the method for generating a series of content areas can detect circumstances about an overall machine-related-status and generate meaningful popup windows and/or views, as part of a series of content areas, at specific positions at the workplace. The method enables to make a recommendation of a position where a faceplate and/or view and/or a pop-up, as part of a series of content areas, is opened at a specific display and/or device, which is typically used by a user respectively an operator, within a recognized context describing the machine-related-status.

In one sense, the method can recommend additional relevant faceplates and/or views and/or popups as examples of content areas that can be generated to be presented at a display screen. That means, if a computer program is comprising instructions that, when the computer program is executed by the HMI workspace executes the method for generating the series of content areas, the display screen of the HMI workplace will present a series of content areas at a required position every time the overall machine-related-status is similar to a stored overall machine-related-status in the first database-system.

Advantageously, the method for generating a series of content areas can increase the effectiveness of an operator when working on an industrial workplace. This can reduce a time to take action and can increase safety based on a faster reaction, particularly in critical situations. Additionally, the method for generating a series of content areas improves the usability of the first processing unit and can be adapted to an operator's behavior and expectations, to increase productivity.

According to an aspect, the machine-system is one of a plurality of machine-systems, and wherein preferably the plurality of machine-systems can be coupled for communication by a distributed process control system.

According to an aspect, the respective position of each content area of the series of content areas is specific for the actual overall machine-related status.

According to an aspect, at least one content area of the series of content areas is generated, and preferably presented at a display screen, to operate a machine-system, particularly by a user.

According to an aspect, the content area includes an operating area to provide at least one control element and/or a process data visualisation area and/or a selection menu area and/or an alarm band visualisation area and/or a trend view and/or a process graphic and/or a faceplate for control of the machine-system.

According to an aspect, the comparing of the actual provided overall machine-related-status with the stored plurality of overall machine-related-status is based on a calculation, whether a similarity value of the actual provided overall machine-related-status and one of the stored plurality of overall machine-related-status is within boundary values for comparing.

Using other words, all interactions of the user with the HMI workplace are collected together with contextual information about the machine-system and machine-operation related information. This includes the current condition of the machine-system and the HMI workplace, but can also incorporate the situation of the active user, e.g. which display is inside the operators' field of view.

According to an aspect, the overall machine-related-status includes a machine-system status and a machine-operation related information.

According to an aspect, the machine-operation related information includes operational context information of the machine-system and/or device information of a device driving the display screen and/or login information of the device driving the display screen and/or login user information of a user, which is logged-in at the device driving the display screen.

Particularly, the series of content areas can be presented at a multitude of display screens and/or a display of different types of devices.

According to an aspect, the login information includes an identifier of the user of the device driving the display screen and/or a type of the device operated by the user.

According to an aspect, the operational context information of the machine system includes device information driving the display screen, particularly which is operated by a user and/or operational user information and/or individual user information.

According to an aspect, the operational user information includes a time of a day and/or a day of the week and/or name of the shift the user of the device driving the display screen is participating and/or a number of operators actual present in a control room for controlling the plurality of machine-systems.

According to an aspect, the individual user information includes an identifier of the user and/or a professional role of the user and/or professional duties of the user and/or a video of the user, particularly for determining a mood of the user and/or for determining a stress level of the user and/or a detected stress level of the user, preferably including a heart rate of the user and/or currently active views and/or a currently actively operated device, which is preferably determined by a last interaction with the device driving the display screen and/or an actively used display screen, which preferably is determined by tracking eyes of the user and/or determined by motion detection of the user.

According to an aspect, the machine-system is part of a plurality of machine-systems and the machine-system status includes a distributed-process-control-system state of the machine-system and/or process values of the machine-system and/or current alarms of the machine-system and/or process values deviations of the machine-system.

According to an aspect, the plurality of machine-systems are communicatively coupled to a distributed-process-control-system and particularly an actual status of the at least one machine system is provided by the distributed process control system.

A method to assign a series of content areas, which are generated for presentation at a display screen, to an overall machine-related-status of a machine-system, is proposed including:

logging a plurality of series of content areas generated for presentation at the display screen, including a respective position for presentation at the display screen of each of the content areas, and linking it with the respective overall machine-related-status, which is related to the respective content area, and which is current, when the series of content areas are generated, using a second database-system;

determining correlations between the logged plurality of series of content areas generated and the linked overall machine-related-status, using a second processing unit;

assigning each of the determined correlating overall machine-system-status to the respective series of content areas including the respective position of each of the content areas generated; and storing each of the assigned overall machine-system-status with the respective series of content areas generated for presentation at the display screen, including the respective position, to a first database-system.

Using other words the method to assign a series of content areas to an overall machine-related-status collects information on where and when a user opens specific series of content areas, e.g., views or popup windows, at his workplace.

The method to assign a series of content area to an overall machine-related-status collects also additional information that represents the situation, when the GUI interaction, as presented at the display screen, happened.

The method captures interactions with series of content areas as e.g. faceplates and/or views and/or popups and correlates them with contextual process information as included in the overall machine-related-status.

In case there is a maximum number of content areas, as e.g. faceplates and/or views and/or popups, that can be opened on a display screen, e.g., because of small screen size on tablets, the algorithm can, based on the analysis of past behavior, "decide" what part of a series of content areas should be replaced, i.e., closed in favor of a new instance of content area.

This results in, that based on the method as described above, the method is able to "understand" the information needed by a human being to analyze a certain situation in respect to the overall machine-related-status. The method is set up in such a way to be able to learn how to "reason", in respect to a series of content areas generated, in such situations.

Such a detailed logging of user inputs and interactions including generated series of content areas for presentation at a display screen, respectively at a GUI, enables to capture training data reflecting user's behavior while optionally considering the system context.

Such system context, respectively machine-system status, e.g. can include active alarms and/or process values and/or currently active views and/or time of the day and/or operator's mood and/or a facial expression of the user and/or a stress level of the user and/or a heart rate of the user and/or a currently active device, as determined by a last interaction with a processing unit including a display screen and/or an active monitor, which can be determined by tracking eyes to determine a direction where the user is looking to and/or a motion detection, if the user is moving.

The correlation between the logged plurality of series of content areas generated and the linked overall machine-related-status can be determined using learning algorithms, as e.g. statistical analysis and/or pattern recognition and/or Artificial Neural Networks and/or machine learning, etc.

According to an aspect, the method can, based on a user input and the overall machine-related-status either directly generate, and preferably display, a series of content areas assigned to the overall machine-related-status on a most suitable device, and most suitable viewport on the device or make a proposal to the user to generate the series of content areas respectively.

According to an aspect, the method for generating a series of content areas suggests a series of content areas to be generated to be displayed on a display screen, particularly e.g. by using a dialog and/or by proposing the target layout of views using transparency.

According to an aspect, the method for generating a series of content areas for presentation at a display screen and the method to assign a series of content areas operate concurrently.

Using other words, a learning and training mode to assign a series of content areas to an overall machine-related-status of a machine-system can run concurrently with the method for generating a series of content areas for presentation at a display screen at runtime. In the training mode, the method can log a state of the controlled process and assign a sequence of GUI actions, as an example for a series of content areas, and/or include operational context and/or user context and/or the used device and/or an interaction with/at a workstation, as an example for machine-operation related information.

According to an aspect, the first database-system is equal to the second database-system.

According to an aspect, the second database system is configured to capture interactions of a user operating a user interface of the device driving the display screen, particularly to collect information of the overall machine-system-status.

According to an aspect, the series of content areas includes content areas selected by a user of the device driving the display screen and an individual rearrangement of a position of each of the content areas selected by the user.

According to an aspect, the correlation of the logged plurality of series of content areas generated for presentation at the display screen and the linked overall machine-related-status is determined based on a statistical analysis and/or a pattern recognition method and/or a principal component analysis method to filter most significant correlations and/or comprises utilization of an unsupervised learning algorithm to train a neural network to identify appropriate correlating relationships.

Using other words, determining correlations of the logged plurality of series of content areas generated and the linked overall machine-related-status is to find a probability that a specific first content area, i.e. a trigger action, is executed at a specific overall machine-related-status of the machine-system. Additionally or alternatively a probability is determined that a user, which started a series of content areas with a specific first content area, will complete the series of content areas as before, particularly if a similar overall machine-related-status is currently present.

Preferably, to determine the correlation, it can be counted how many times the same series of content areas is generated at a similar overall machine-related-status versus a sum of other overall machine-related-status of the machine-system with the same trigger action. That means it can be determined for a plurality of similar overall machine-related-status how often comparable series of content areas are generated to be presented at the display screen.

A comparable series of content areas can be determined by comparing the number of content areas within a series of content areas and/or the specific content areas included in the series of content areas and/or the quadrants of the screen where the individual content areas of the series of content areas are generated.

The first content area of the series of content areas, i.e., the trigger action, can be more important for determining a comparable series of content areas than the order of the content areas within the series of content areas. That means that the number of content areas and the type of the content areas can be used to determine a comparable series of content areas.

According to an aspect, the determination of correlations and assigning of the logged plurality of series of content areas generated for presentation at the display screen with the linked overall machine-related-status of a machine-system comprises:
  building a multitude of series of generated content areas, which comprise generated content areas, which are within a predefined first timespan after a first generated content area; and wherein no content area was generated for presentation a second time span prior to the generation of the first generated content area;
  grouping action series of content areas out of the multitude of series of content areas, which are starting with the same first generated content area, wherein the content areas are related to the machine-system;
  determining a similarity value of the overall machine-related-status, which are timely related to an overall duration of the action series of content areas; and
  assigning the action series of content areas to such overall machine-related-status, which are within predefined boundary values of the similarity value.

According to an aspect, the similarity value is determined using a probability metric. Such a probability metric can measure, e.g., how frequently a user generated a series of content areas in a respective overall machine-related-status in the past, based on probability calculations.

According to an aspect, each content area of the action series of content areas is removed from the series, if the respective content area is redundant.

Using other words, for assigning a series of content areas to an overall machine-related-status of a machine-system raw data of the logged plurality of series of content areas generated for presentation at the display screen and the respective overall machine-related-status are stored respectively in the first database-system and the second database-system are post-processed, where redundant content areas within the series of content areas are removed, as e.g. obviously erroneous actions.

Primarily based on timely correlating series of content areas are formed including a common specific first content area, that means a trigger action, as e.g. "a user opened a view with a process graphic A" and related follow-up actions, e.g., "a user moved the view to screen 1" and "a user opened a trend view."

Using other words, the series of content areas or the grouped content areas are assigned to a sub-set of related overall machine-related-status, particularly to relevant machine-system status and stored in the second database-system, which can be named state-actions database.

Additionally or alternatively, the machine-system status can be filtered in respect to relevance for assignment to the series of content areas.

A relevance of a subset of machine-system status can be determined based on the time of the actions taken place, as e.g. alarms and/or process values, and relationships amongst machine-systems and/or machine-subsystems involved. The machine-system status can include status values logged prior to a point in time where the user generates a first content area for presentation at the display screen.

According to an aspect, the similarity value of a selected relation of overall machine-related-status with an action series of content areas is overwritten by the user for compensation of a misleading determined correlation.

Using other words, the method to assign a series of content areas includes a feedback functionality to be used by a user to directly improve the assigned series of content areas with the overall machine-related-status by modifying and/or overwriting the similarity value manually, to provide direct feedback on the appropriateness of follow-up actions as defined by an assigned series of content areas. If a user was unhappy with the system response in form of the series of content areas assigned to the overall machine-related-status, e.g., because there was a substantial change in the controlled process, the similarity value can be directly affected by the user.

Such a direct feedback method can be used to directly improve the assignment of the overall machine-related-status to a series of content areas.

A first processing unit is proposed, including:
an input port, for providing an overall machine-related-status of a machine-system of a plurality of machine-systems;
a computing unit, for:
accessing a first database-system by means of the first processing unit, the first database-system storing a plurality of series of content areas including a respective position of each of the content areas for presentation at a display screen assigned to the respective overall machine-related-status;
determining the series of content areas related to the actual overall machine-related-status, by comparing the actual provided overall machine-related-status with the stored plurality of overall machine-related-status, which are assigned to the respective series of content areas, for selecting the series of content areas assigned to the actual overall machine-related-status, preferably according to any of the preceding claims; and
generating the selected series of content areas, including a respective position of each of the content areas, for presentation the series of content areas related to the actual provided machine-system status at the respective position at the display screen; and an output port, for outputting the generated selected series of content areas, including a respective position of each of the content areas, for presentation at a display screen.

A use of a first processing unit for generating a series of content areas to be presented at a display screen is proposed, wherein the series of content areas is related to an overall machine-related-status of a machine-system by:
providing an actual overall machine-related-status at an input of the first processing unit;
accessing a first database-system by means of the first processing unit, the first database-system storing a plurality of series of content areas including a respective position of each of the content areas for presentation at a display screen assigned to the respective overall machine-related-status;
determining the series of content areas related to the actual overall machine-related-status, by comparing the actual provided overall machine-related-status with the stored plurality of overall machine-related-status, which are assigned to the respective series of content areas, for selecting the series of content areas assigned to the actual overall machine-related-status, preferably according to the method for generating a series of content areas as described above;
generating the selected series of content areas, including a respective position of each of the content areas, by means of the first processing unit, for presentation the series of content areas related to the actual provided machine-system status at the respective position at the display screen; and
outputting the generated selected series of content areas, including a respective position of each of the content areas, for presentation at a display screen.

A computer program is proposed, comprising instructions that, when the computer program is executed by a computer, cause the computer program to execute a method as described above.

Advantageously, such a computer program enables to transfer the method easily to different computer systems.

A computer readable medium is proposed, having stored the computer program described above.

Advantageously, this enables to transfer the method easily for different applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating a series of content areas for presentation at a display screen, wherein the series of content areas is related to an overall machine-related-status of a machine-system, the method comprising:
    providing an actual overall machine-related-status at an input of a first processing unit, wherein the overall machine-related-status includes machine-operation related information, the machine-operation related information including login information of a device driving the display screen;
    accessing a first database-system by utilizing the first processing unit, the first database-system storing a plurality of series of content areas including a respective position of each of the content areas for presentation at the display screen assigned to the respective overall machine-related-status;
    determining the series of content areas related to the actual overall machine-related-status, by comparing the actual provided overall machine-related-status with the stored plurality of overall machine-related-status, which are assigned to the respective series of content areas, for selecting the series of content areas assigned to the actual overall machine-related-status, by means of the first processing unit; and
    generating the selected series of content areas, including a respective position of each of the content areas, by utilizing the first processing unit, for presentation the series of content areas related to the actual provided machine-system status at the respective position at the display screen.

2. The method according to claim 1, wherein the overall machine-related-status includes a machine-system status.

3. The method according to claim 2, wherein the machine-operation related information includes operational context information of the machine-system and/or device information of a device driving the display screen and/or logged in user information of a user, which is logged in at the device driving the display screen.

4. The method according to claim 2, wherein the machine-system is part of a plurality of machine-systems and the machine-system status includes a distributed-process-control-system state of the machine-system and/or process values of the machine-system and/or current alarms of the machine-system and/or process values deviations of the machine-system.

5. The method according to claim 4, wherein the plurality of machine-systems are communicatively coupled to a distributed-process-control-system and particularly an actual status of the at least one machine system is provided by the distributed process control system.

6. A method to assign a series of content areas, which are generated for presentation at a display screen, to an overall machine-related-status of a machine-system, the method comprising:
    logging a plurality of series of content areas generated for presentation at the display screen, including a respective position for presentation at the display screen of each of the content areas, and linking it with the respective overall machine-related-status, which is related to the respective content area, and which is current, when the series of content areas are generated, using a fourth database-system, wherein the overall machine-related-status includes machine-operation related information, the machine-operation related information including login information of a device driving the display screen;
    determining correlations of the logged plurality of series of content areas generated and the linked overall machine-related-status, using a second processing unit;
    assigning each of the determined correlating overall machine-system-status to the respective series of content areas including the respective position of each of the content areas generated; and
    storing each of the assigned overall machine-system-status with the respective series of content areas generated for presentation at the display screen, including the respective position, to a first database-system.

7. The method according to claim 6, wherein the correlation of the logged plurality of series of content areas generated for presentation at the display screen and the linked overall machine-related-status is determined based on a statistical analysis and/or a pattern recognition method and/or a principal component analysis method to filter most significant correlations and/or comprises utilization of an unsupervised learning algorithm to train a neural network to identify appropriate correlating relationships.

8. The method according to claim 6, wherein the determination of correlations and assigning of the logged plurality of series of content areas generated for presentation at the display screen with the linked overall machine-related-status of a machine-system comprises:
    building a multitude of series of generated content areas, which comprise generated content areas, which are within a predefined first timespan after a first generated content area; and wherein no content area was generated for presentation a second time span prior to the generation of the first generated content area;
    grouping action series of content areas out of the multitude of series of content areas, which are starting with the same first generated content area, wherein the content areas are related to the machine-system;
    determining a similarity value of the overall machine-related-status, which are timely related to an overall duration of the action series of content areas; and
    assigning the action series of content areas to such overall machine-related-status, which are within predefined boundary values of the similarity value.

9. The method according to claim 8, wherein each content area of the series of content areas is removed from the series, if the respective content area is redundant.

10. The method according to claim 8, wherein the similarity value of a selected relation of the overall machine-related-status with an action series of content areas is overwritten by the user for compensation of a misleading determined correlation.

11. A first processing unit with:
    an input port, for providing an overall machine-related-status of a machine-system of a plurality of machine-systems;
    a computing unit, for:
        accessing a first database-system by utilizing the first processing unit, the first database-system storing a plurality of series of content areas including a respective position of each of the content areas for presentation at a display screen assigned to the respective overall machine-related-status, wherein the overall machine-related-status includes machine-operation related information, the machine-operation related information including login information of a device driving the display screen;
        determining the series of content areas related to the actual overall machine-related-status, by comparing the actual provided overall machine-related-status with the stored plurality of overall machine-related-status, which are assigned to the respective series of content areas, for selecting the series of content areas assigned to the actual overall machine-related-status; and
        generating the selected series of content areas, including a respective position of each of the content areas, for presentation the series of content areas related to the actual provided machine-system status at the respective position at the display screen; and
    an output port, for outputting the generated selected series of content areas, including a respective position of each of the content areas, for presentation at the display screen.

12. The first processing unit of claim 11, wherein the first processing unit is configured to generate a series of content areas to be presented at the display screen, wherein the series of content areas is related to the overall machine-related-status of the machine-system by:
    providing an actual overall machine-related-status at an input of the first processing unit;
    accessing a first database-system, the first database-system storing a plurality of series of content areas including a respective position of each of the content areas for presentation at the display screen assigned to the respective overall machine-related-status;
    determining the series of content areas related to the actual overall machine related-status, by comparing the actual provided overall machine-related-status with the stored plurality of overall machine-related-status, which are assigned to the respective series of content areas, for selecting the series of content areas assigned to the actual overall machine-related-status;
    generating the selected series of content areas, including a respective position of each of the content areas, by utilizing the first processing unit, for presentation the series of content areas related to the actual provided machine-system status at the respective position at the display screen; and
    outputting the generated selected series of content areas, including a respective position of each of the content areas, for presentation at the display screen.

* * * * *